United States Patent
Inayoshi et al.

(10) Patent No.: US 8,433,476 B2
(45) Date of Patent: Apr. 30, 2013

(54) APPARATUS AND METHOD FOR DETERMINING SEAT OCCUPANCY

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 342 days.

(21) Appl. No.: 12/814,048

(22) Filed: Jun. 11, 2010

(65) Prior Publication Data

US 2011/0010039 A1    Jan. 13, 2011

(30) Foreign Application Priority Data

Jul. 7, 2009    (JP) ................................. 2009-160902

(51) Int. Cl.
*G06F 7/02* (2006.01)
(52) U.S. Cl.
USPC ................... 701/36; 701/43; 701/45; 701/49; 180/268; 180/273; 73/781
(58) Field of Classification Search .................... 701/29, 701/36, 43, 45, 49; 180/268, 273; 73/781
See application file for complete search history.

(56) References Cited

U.S. PATENT DOCUMENTS

| | | | | |
|---|---|---|---|---|
| 5,996,421 | A * | 12/1999 | Husby | 73/862.451 |
| 6,594,571 | B2 * | 7/2003 | Sakai et al. | 701/45 |
| 6,808,201 | B2 * | 10/2004 | Aoki | 280/735 |
| 6,836,715 | B2 * | 12/2004 | Sakai et al. | 701/45 |
| 7,032,968 | B2 * | 4/2006 | Sakai et al. | 297/217.2 |
| 7,866,691 | B2 * | 1/2011 | Inayoshi et al. | 280/735 |
| 2002/0129986 | A1 * | 9/2002 | Aoki | 180/268 |
| 2002/0175490 | A1 * | 11/2002 | Sakai et al. | 280/273 |
| 2003/0168895 | A1 * | 9/2003 | Sakai et al. | 297/216.12 |
| 2004/0024508 | A1 * | 2/2004 | Sakai et al. | 701/45 |
| 2004/0032118 | A1 * | 2/2004 | Kojima et al. | 280/735 |
| 2004/0159485 | A1 * | 8/2004 | Sakai et al. | 180/268 |
| 2005/0057026 | A1 * | 3/2005 | Hattori et al. | 280/735 |
| 2005/0216158 | A1 * | 9/2005 | Sakai | 701/45 |
| 2006/0180376 | A1 * | 8/2006 | Kobayashi et al. | 180/268 |
| 2008/0054690 | A1 * | 3/2008 | Inayoshi et al. | 297/216.1 |
| 2008/0231094 | A1 * | 9/2008 | Okawa | 297/217.3 |

FOREIGN PATENT DOCUMENTS

JP    2009-046093 A    3/2009

\* cited by examiner

*Primary Examiner* — Mary Cheung
*Assistant Examiner* — Truc M Do
(74) *Attorney, Agent, or Firm* — Buchanan Ingersoll & Rooney PC (57) ABSTRACT

An apparatus for determining a seat occupancy includes a load detecting portion, a seatbelt detecting portion, and a seat occupancy determining portion determining that an adult is seated on the seat in a case where a seating load equal to or greater than a predetermined first load is detected and determining a child seat placed state where a child seat is placed on the seat and fastened by the seatbelt in a case where the seating load smaller than the first load is detected and the engagement of the buckle of the seatbelt is detected. The seat occupancy determining portion maintains a determination result of the child seat placed state even when the seating load becomes equal to or greater than the first load in a case where a predetermined determination result retention condition is satisfied after the child seat placed state is determined.

10 Claims, 6 Drawing Sheets

APPARATUS AND METHOD FOR DETERMINING SEAT OCCUPANCY

CROSS REFERENCE TO RELATED APPLICATIONS

This application is based on and claims priority under 35 U.S.C. §119 to Japanese Patent Application 2009-160902, filed on Jul. 7, 2009, the entire content of which is incorporated herein by reference.

TECHNICAL FIELD

This disclosure relates to an apparatus and a method for determining a seat occupancy.

BACKGROUND DISCUSSION

A known apparatus for determining a seat occupancy is disclosed in JP2009-46093A, for example. According to the apparatus disclosed in JP2009-46093A, load sensors are arranged between a cushion portion of a passenger seat (i.e., a seat cushion) for a vehicle and a floor of the vehicle. Then, the seat occupancy of the seat is detected and determined on the basis of a sum of loads detected by the respective load sensors. Specifically, side leg portions are provided at four corners of a lower portion of the cushion portion of the seat and by means of which the cushion portion is movably in engagement with seat rails. The load sensors are provided at the respective side leg portions so as to detect loads applied to the respective side leg portions. A seat occupancy determination portion compares the sum of the loads detected by the respective load sensors with a predetermined threshold value so as to determine the seat occupancy of the seat.

The seat occupancy state detected by the apparatus is used for controlling an air bag operation. That is, in a case where it is determined that an adult passenger is seated on the passenger seat, the air bag is able to be fully deployed. In a case where it is determined that no occupant is seated on the passenger seat or a child in a child seat is seated on the passenger seat, the air bag is prohibited from being deployed.

However, the determination of the seat occupancy that is simply based on the sum of the loads applied to the seat may cause a trouble. For example, assuming it is once determined that the child seat is attached to the seat and thereafter the vehicle is accelerated forward, the child seat is pressed against the seat to thereby apply a temporary large load to the seat cushion. In such case, because of the temporary large load applied to the seat, it may be mistakenly determined that the seat occupancy state is shifted from a child seat placed state to an adult seated state.

In addition, in a case where the adult is seated on a forward portion of the seat without leaning his/her back on a seat back of the seat, a sufficient load is prevented from being applied to the seat cushion. In such case, regardless of the fact that the adult is seated on the seat, it may be mistakenly determined that the child seat is placed and fastened on the seat. Accordingly, it is difficult to distinguish between the child seat placed state and the adult seated state when determining the seat occupancy of the seat.

Specifically, the aforementioned issue becomes significant when the number of load sensors provided at the seat for the vehicle is reduced for the purpose of cost reduction of the seat. That is, in a case where the great number of load sensors is attached to various portions of the seat, the seat occupancy state may be precisely detected and determined on the basis of variations of detected loads by the various load sensors. As a result, the seat occupancy of the seat is precisely detected and determined.

On the other hand, when only one load sensor is provided at a left side of the seat while only one load sensor is provided at a right side of the seat, for example, the detection of movement or change of the load in a longitudinal direction of the seat cushion is functionally difficult, which results in difficulties in identifying the aforementioned seat occupancy state. That is, the determination of the seat occupancy of the seat is incompatible with a reduced cost of the seat.

A need thus exists for a method and an apparatus for determining a seat occupancy which is not susceptible to the drawback mentioned above.

SUMMARY

According to an aspect of this disclosure, an apparatus for determining a seat occupancy includes a load detecting portion provided at a seated portion of a seat for a vehicle and detecting a seating load applied to the seated portion, a seatbelt detecting portion detecting an engagement of a buckle of a seatbelt provided at the seat, and a seat occupancy determining portion determining that an adult is seated on the seat in a case where the seating load equal to or greater than a predetermined first load is detected by the load detecting portion and determining a child seat placed state where a child seat is placed on the seat and fastened by the seatbelt in a case where the seating load smaller than the first load is detected by the load detecting portion and the engagement of the buckle of the seatbelt is detected by the seatbelt detecting portion. The seat occupancy determining portion maintains a determination result of the child seat placed state even when the seating load becomes equal to or greater than the first load in a case where a predetermined determination result retention condition is satisfied after the child seat placed state is determined.

According to another aspect of this disclosure, a method for determining a seat occupancy includes detecting a seating load applied to a seated portion of a seat for a vehicle, detecting an engagement or a disengagement of a buckle of a seatbelt provided at the seat, determining an adult seated on the seat in a case where the seating load equal to or greater than a predetermined first load is detected, determining a child seat placed state where a child seat is placed on the seat and fastened by the seatbelt in a case where the seating load smaller than the first load is detected and the engagement of the buckle of the seatbelt is detected, and retaining a determination result of the child seat placed state even when the seating load becomes equal to or greater than the first load in a case where a predetermined determination result retention condition is satisfied after the child seat placed state is determined.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
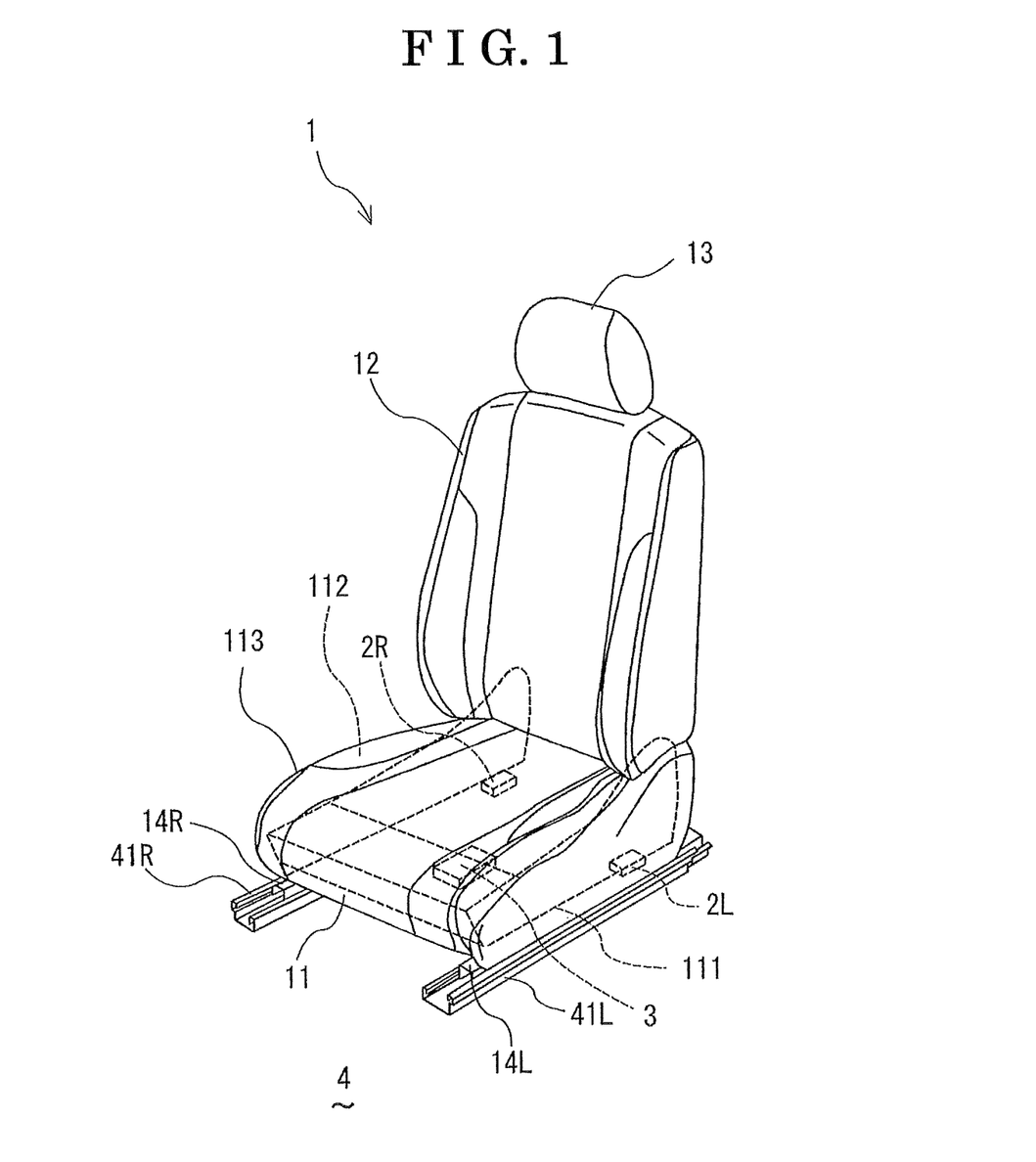
FIG. 1 is a perspective view of a seat for a vehicle where an apparatus for determining a seat occupancy is mounted according to an embodiment disclosed here.

An embodiment disclosed here will be explained with reference to the attached drawings. In the embodiment explained below, a front side for a passenger seated on a seat 1 for a vehicle corresponds to a front side of the seat 1 and left and right sides for the passenger seated on the seat 1 correspond to left and right sides of the seat 1. That is, directions and orientations such as left, right, front, rear, top, and bottom in the explanation below correspond to those when viewed from the passenger seated on the seat 1. As illustrated in FIG. 1, the seat 1, which is a passenger seat mounted on a right-hand drive vehicle, includes a seat cushion 11 on which a passenger is seated and a seat back 12 on which the passenger leans. The seat cushion 11 serves as a seated portion and the seat back 12 is attached at a rear edge of the seat cushion 11 so as to be rotatable in a longitudinal direction of the vehicle. A headrest 13 is attached at an upper end of the seat back 12 so as to support the head of the passenger.

The seat cushion 11 includes a seat frame 111, a pad member 112 arranged at an upper side of the seat frame 111, and a surface portion 113 that covers the surface of the pd member 112. Left and right upper rails 14L and 14R are attached at a lower surface of the seat frame 111. The upper rails 14L and 14R engage with left and right lower rails 41L and 41R fixed to a floor 4 of the vehicle so as to be movable in the longitudinal direction of the vehicle. Accordingly, the seat 1 moves on the floor 4 in the longitudinal direction so as to be positioned and fixed at the desired position of the passenger.

Left and right seat sensors 2L and 2R, each serving as a load detecting portion and a load detecting device, are disposed between the seat frame 111 and the left upper rail 14L and between the seat frame 111 and the right upper rail 14R, respectively. The seat sensors 2L and 2R are load sensors each formed by a strain gauge, or the like. The seat sensors 2L and 2R detect a load applied to the seat cushion 11 downwardly caused by the passenger seated on the seat 1 or luggage placed on the seat 1.

According to the present embodiment, regardless of whether or not the aforementioned load is generated by the passenger seated on the seat 1, a child seat placed on the seat 1, or luggage placed on the seat 1, the load applied to the seat cushion 11 and detected by the seat sensors 2L and 2R is regarded as a seating load. In addition, according to the present embodiment, a type, a model, and a detection principle of each of the seat sensors 2L and 2R are not specifically defined.

The right seat sensor 2R is arranged between a right portion of the seat frame 111 and the right upper rail 14R so as to detect a load applied to a right portion of the seat cushion 11. In the same way, the left seat sensor 2L is arranged between a left portion of the seat frame 111 and the left upper rail 14L so as to detect a load applied to a left portion of the seat cushion 11. The right seat sensor 2R and the left seat sensor 2L are positioned to be away from each other by a predetermined distance in a width direction of the seat cushion 11.

As illustrated in FIG. 1, both the seat sensors 2L and 2R are provided at a rear portion of the seat cushion 11 (specifically, at a rear portion relative to a center of the seat cushion 11 in the longitudinal direction). In the following, in a case where the left and right seat sensors 2L and 2R are correctively described, the term "the seat sensor 2L, 2R" will be used.

Figure 2:
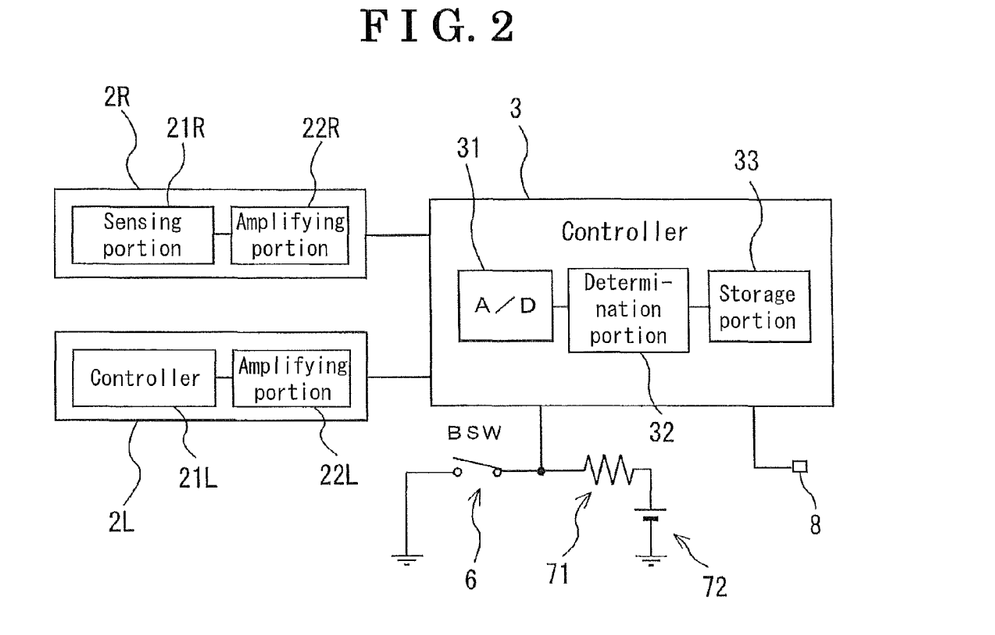
FIG. 2 is a block diagram illustrating the entire apparatus for determining the seat occupancy.

As illustrated in FIG. 2, the seat sensor 2L includes a sensing portion 21L and an amplifying portion 22L for amplifying a detection signal generated by the sensing portion 21L. In the same way, the seat sensor 2R includes a sensing portion 21R and an amplifying portion 22R for amplifying a detection signal generated by the sensing portion 21R. Each of the sensing portions 21L and 21R is formed by a Wheatstone bridge circuit including four strain gauges.

A controller 3 serving as a seat occupancy determining portion is connected to the seat sensor 2L, 2R. The controller 3 includes an A/D converter 31 digitally converting the detection signal by the seat sensor 2L, 2R, a determination portion 32 determining a seat occupancy state of the seat 1 based on the detection signal, and a storage portion 33 storing various data necessary for the determination of the seat occupancy.

A buckle switch 6, serving as a seatbelt detecting portion, of a seatbelt device provided at the seat 1 is connected to the controller 3. A battery 72 of the vehicle is connected to the buckle switch 6 via a direct current resistance 71. In a case where the buckle switch 6 is in an open state, an electric current is not supplied to the direct current resistance 71. Thus, the controller 3 detects a positive terminal voltage (High) of the battery 72. In a case where the buckle switch 6 is in a closed state, the electric current is supplied to the direct current resistance 71. Then, the controller 3 detects a voltage drop (Low) caused by the direct current resistance 71. Accordingly, the controller 3 detects a state where a buckle of the seatbelt engages with a tongue so that the seatbelt device is fastened.

Further, a speed sensor 8 of the vehicle is connected to the controller 3. The controller 3 detects a vehicle speed by means of the speed sensor 8. In addition, the controller 3 detects a vehicle acceleration by differentiating the vehicle speed detected by the speed sensor 8. In addition to the speed sensor 8, an acceleration sensor detecting the vehicle acceleration may be provided at the vehicle.

A transition between determinations of the seat occupancy state of the seat 1 by the controller 3 will be explained with reference to FIG. 3. The controller 3 performs a seat occupancy determination of the seat 1 based on a detection result of the buckle switch 6 and a result of a sum of the detected load by the right seat sensor 2R and the detected load by the left seat sensor 2L (which will be hereinafter referred to as a total load WR+WL). The total load WR+WL serves as a seating load. In a case where the buckle switch 6 is not turned on and the load pressing the seat 1 downwardly is not detected by the seat sensor 2L, 2R, the controller 3 determines a "no passenger seated state" of the seat 1 as illustrated by J1 in FIG. 3.

Figure 3:
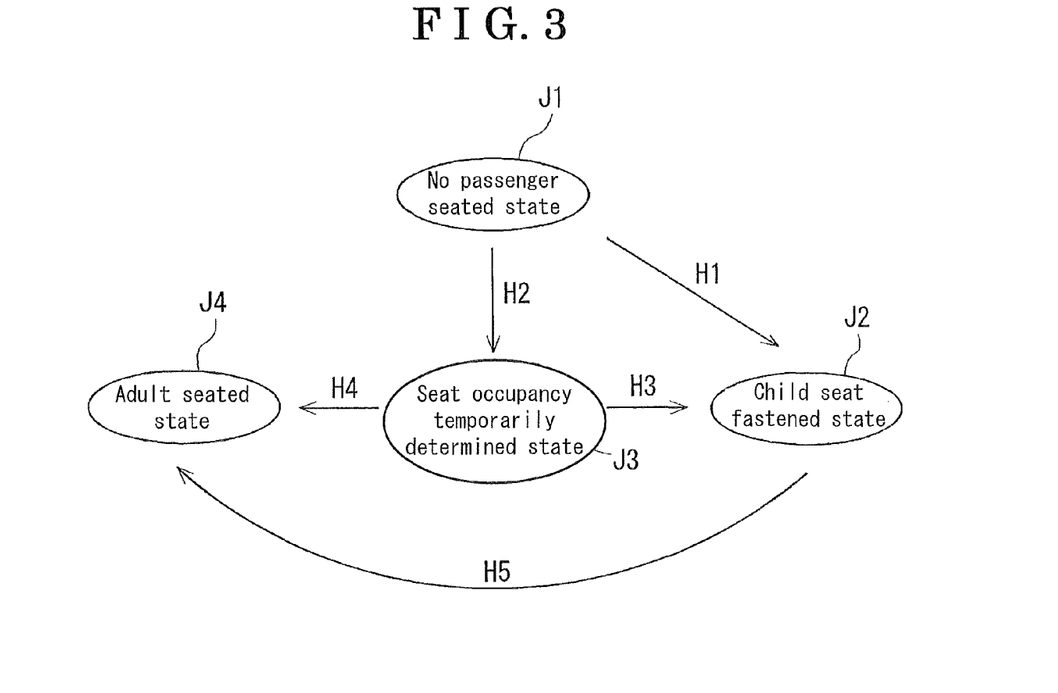
FIG. 3 is a simplified view explaining a transition of a seat occupancy state of the seat.

When a predetermined first condition (i.e., steps S401 to S405 in FIG. 4) is satisfied after the determination of the "no passenger seated state", the controller 3 determines a "child seat fastened state" of the seat 1 as illustrated by J2 in FIG. 3. That is, as illustrated by H1 in FIG. 3, the seat occupancy determination is shifted from the "no passenger seated state" to the "child seat fastened state".

The aforementioned "child seat fastened state" corresponds to a state where a child seat (which may also be called an infant seat) is placed on the seat 1 and the tongue of the seatbelt device that surrounds the child seat engages with the buckle so that the child seat is fastened on the seat 1 by the seatbelt device. The "child seat fastened state" serves as a "child seat placed state" of the seat 1.

In a case where a predetermined second condition (i.e., step S501 in FIG. 5) is satisfied after the determination of the "no passenger seated state" of the seat 1, the controller 3 determines a "seat occupancy temporarily determined state" as illustrated by J3 in FIG. 3. That is, as illustrated by H2 in FIG. 3, the seat occupancy determination is shifted from the "no passenger seated state" to the "seat occupancy temporarily determined state". The "seat occupancy temporarily determined state" corresponds to a state where an adult passenger is seated on a front portion of the seat 1, a state where luggage is placed on the seat 1, and the like.

In a case where a predetermined third condition (i.e., steps S401 to S405 in FIG. 4) is satisfied after the determination of the "seat occupancy temporarily determined state", the controller 3 determines the "child seat fastened state" of the seat 1. That is, as illustrated by H3 in FIG. 3, the seat occupancy determination is shifted from the "seat occupancy temporarily determined state" to the "child seat fastened state".

In a case where a predetermined fourth condition (i.e., steps S503 to S505 in FIG. 5) is satisfied after the determination of the "seat occupancy temporarily determined state", the controller 3 determines the "adult seated state" of the seat 1 as illustrated by J4 in FIG. 3. That is, as illustrated by H4 in FIG. 3, the seat occupancy determination is shifted from the "seat occupancy temporarily determined state" to the "adult seated state". According to the present embodiment, the "adult seated state" corresponds to a state where the adult passenger is seated on the seat 1 and a sufficient load is applied to the seat cushion 11.

The aforementioned adult passenger corresponds to a passenger having a physique of an adult in view of weight and thus does not necessarily correspond to an actual adult specified by law. Therefore, in a case where an underage passenger having the physique of an adult is seated on the seat 1, the "adult seated state" may be determined.

When a predetermined fifth condition (i.e., steps S404, 405, S407 and S408 in FIG. 4) is satisfied after the "child seat fastened state" is once determined, the controller 3 then determines the "adult seated state" of the seat 1. That is, as illustrated by H5 in FIG. 3, the seat occupancy determination is shifted from the "child seat fastened state" to the "adult seated state". When the controller 3 determines the "adult seated state" of the seat 1, an air bag ECU controls an airbag to be fully deployable. When the controller 3 determines the state of the seat 1 to be other than the "adult seated state", the air bag ECU controls the airbag not to be fully deployed.

Next, a method for determining the transition of the seat occupancy state will be explained with reference to a flowchart illustrated in FIG. 4 so that the controller 3 determines the transition of the seat occupancy state from the "no passenger seated state" or the "seat occupancy temporarily determined state" to the "child seat fastened state" as illustrated by H1 or H3 in FIG. 3, and then determines the transition from the "child seat fastened state" to the "adult seated state" as illustrated by H5 in FIG. 3.

Figure 4:
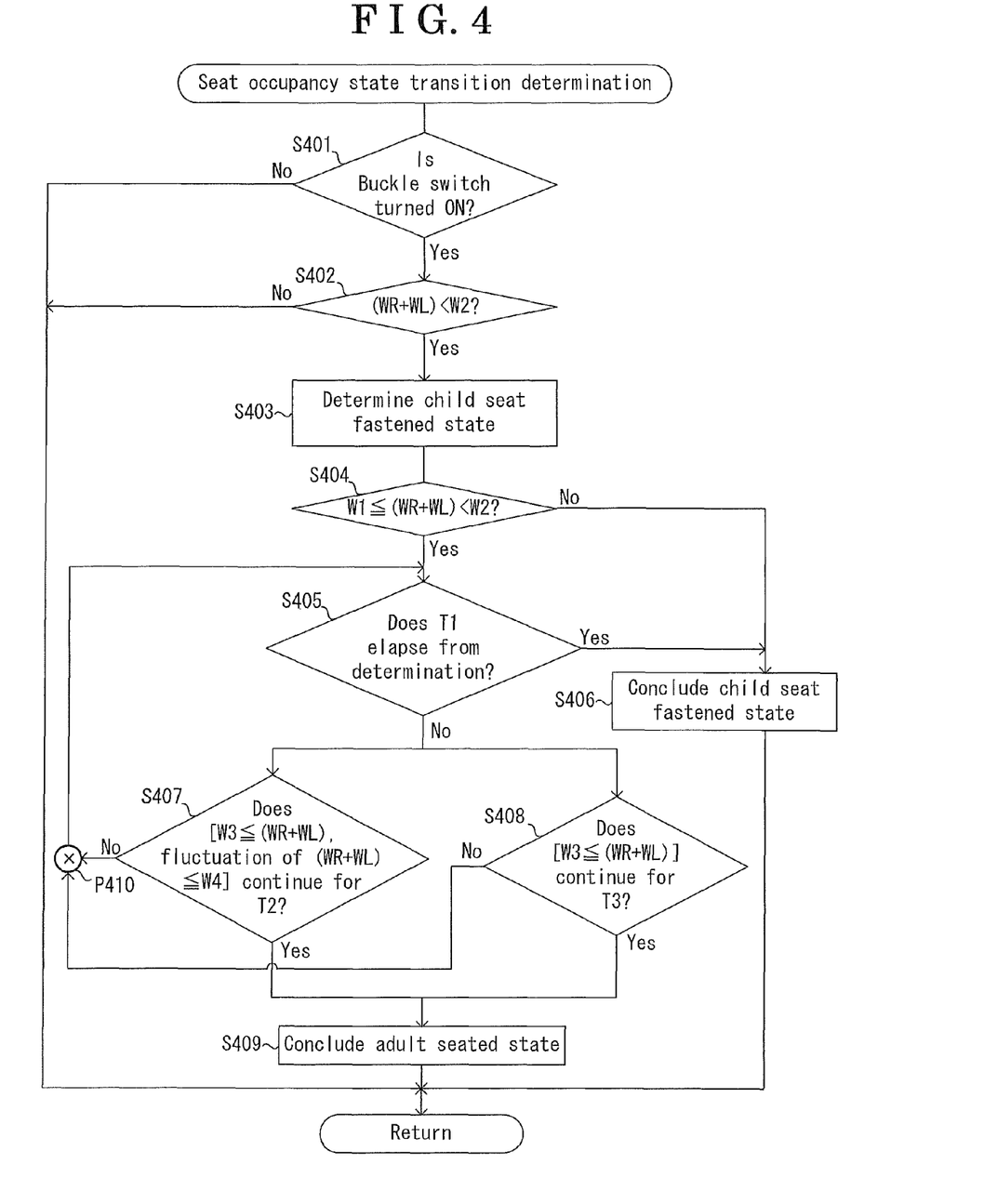
FIG. 4 is a flowchart illustrating a determination method by the apparatus for determining the seat occupancy illustrated in FIG. 2.

In FIG. 4, steps S407 and S408 in the flowchart are concurrently performed. Step S409 is performed when the positive determination is made at least one of steps S407 and S408. In addition, a linked point P410 in FIG. 4 indicates that a flow operation returns to step S405 in a case where the negative determination is made at both steps S407 and S408.

When it is detected that the seatbelt device of the seat 1 is fastened because of the turning on of the buckle switch 6 from the "no passenger seated state" or the "seat occupancy temporarily determined state" in step S401, it is then determined whether or not the total load WR+WL is smaller than a predetermined second threshold load W2 in step S402. When it is determined that the total load WR+WL is smaller than the second predetermined threshold load W2, the "child seat fastened state" is determined in step S403. When it is determined that the buckle switch 6 is not turned on in step S401 or when it is determined that the total load WR+WL is not smaller than the second threshold load W2 in step S403, the determination of the seat occupancy state transition is terminated.

When the "child seat fastened state" of the seat 1 is determined in step S403, then it is determined in step S404 whether or not the total load WR+WL obtained at a time when the "child seat fastened state" is determined is smaller than the second threshold load W2 and equal to or greater than a predetermined first threshold load W1 that is smaller than the second threshold load W2. When the total load WR+WL upon the determination of the "child seat fastened state" is smaller than the first threshold load W1, the "child seat fastened state" is concluded in step S406.

In a case where the total load WR+WL at the determination of the "child seat fastened state" is equal to or greater than the first threshold load W1 and is smaller than the second threshold load W2, it is then determined whether or not a predetermined first threshold time T1 serving as a first time elapses from the determination of the "child seat fastened state" in step S405. In this case, the condition of whether or not the first threshold time T1 elapses from the determination of the "child seat fastened state" serves as a determination result retention condition.

When it is determined that the first threshold time T1 elapses after the determination of the "child seat fastened state", the "child seat fastened state" is concluded in step S406. Thus, even when the total load WR+WL turns to be equal to or greater than a predetermined third threshold load W3 (which will be explained later), the determination of the "child seat fastened state" is maintained. In a case where the first threshold time T1 does not elapse from the determination of the "child seat fastened state", it is then determined in step S407 whether or not the present total load WR+WL is equal to or greater than the third threshold load W3 that serves as a first load and a state, where a fluctuation of the total load WR+WL is within a predetermined fourth threshold load W4, is maintained for a predetermined second threshold time T2.

In addition, in parallel with step S407, it is determined in step S408 whether or not a state, where the present total load WR+WL is equal to or greater than the third threshold load W3, is maintained for a predetermined third threshold time T3. The third threshold time T3 is defined to be longer than the second threshold time T2. At this time, the third threshold load W3 may be defined to be equal to the second threshold load W2. When at least one of the determination condition in step S407 and the determination condition in step S408 is satisfied, the seat occupancy determination is shifted from the "child seat fastened state" to the "adult seated state". The "adult seated state" is then concluded in step S409.

In a state where neither the determination condition in step S407 nor the determination condition in step S408 is satisfied, the flow operation returns to step S405 where it is again determined whether or not the first threshold time T1 elapses from the determination of the "child seat fastened state". In a state where neither the determination condition in step S407 nor the determination condition in step S408 is satisfied and the first threshold time T1 elapses from the determination of the "child seat fastened state", the seat occupancy determination is not shifted to the "adult seated state" and the "child seat fastened state" is concluded in step S406. Afterwards, the determination result of the "child seat fastened state" is maintained.

In step S407, the determination condition thereof may be satisfied in a case where the total load WR+WL becomes equal to or greater than the third threshold load W3 and a fluctuation of the total load WR+WL is within the fourth threshold load W4 before the first threshold time T1 elapses from the determination of the "child seat fastened state", and thereafter the resulting load value is maintained until the second threshold time T2 elapses after the elapse of the first threshold time T1 from the determination of the "child seat fastened state".

Further, in step S408, the determination condition thereof may be satisfied in a case where the total load WR+WL becomes equal to or greater than the third threshold load W3 before the first threshold time T1 elapses from the determination of the "child seat fastened state" and thereafter the resulting value is maintained until the third threshold time T3 elapses after the elapse of the first threshold time T1 from the determination of the "child seat fastened state".

The first threshold time T1 is specifically and appropriately defined by an execution of various trials so as to identify a case where the adult is seated forward of the seat 1 (i.e., seated on a forward portion of the seat 1) and a case where the child seat is fastened on the seat 1, followed by the forward acceleration of the vehicle.

Figure 6:
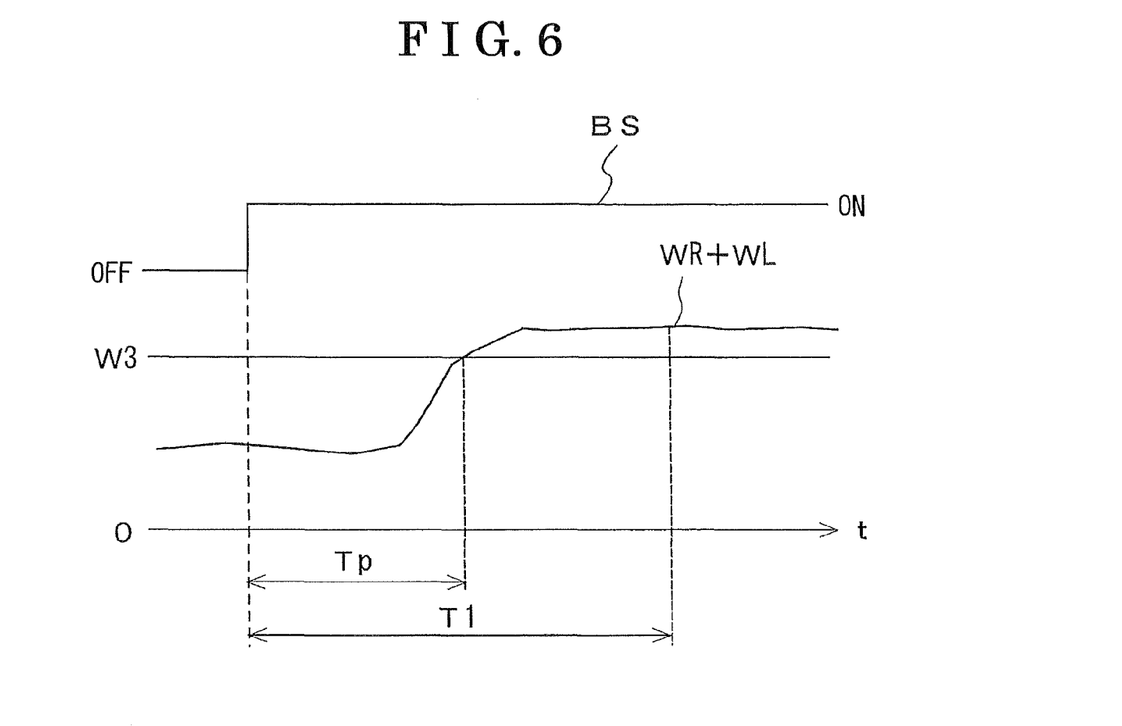
FIG. 6 is a diagram illustrating a seating load of the seat when a passenger who is seated forward of the seat adjusts his/her posture or seating position.

A trial result of a temporal change of the total load WR+WL in a state where the adult is seated forward of the seat 1 is shown in FIG. 6. In FIG. 6, an operation signal of the buckle switch 6 is indicated by BS and the total load WR+WL is indicated by WR+WL.

As illustrated in FIG. 6, when the adult passenger is seated forward of the seat 1, a sufficient seating load is prevented from being applied to the seat sensor 2L, 2R provided at the seat 1. Thus, the total load WR+WL is much smaller than the third threshold load W3 by which the controller 3 determines the "adult seated state". Such tendency is notable when the seat sensor 2L, 2R is arranged only at the rear portion of the seat cushion 11.

However, when the passenger adjusts his/her posture or seating position after being seated on the forward portion of the seat 1, the total load WR+WL increases within a short time period. The load WR+WL exceeds the third threshold load W3 around time Tp after the buckle switch 6 is turned on (of which a timing is considered to be substantially the same as the determination of the "child seat fastened state") as illustrated in FIG. 6. Time Tp is much shorter than the first threshold time T1. Accordingly, the detection that the total load WR+WL reaches the third threshold load W3 within the first threshold time T1 enables the determination of the adult seated on the seat 1.

Figure 7:
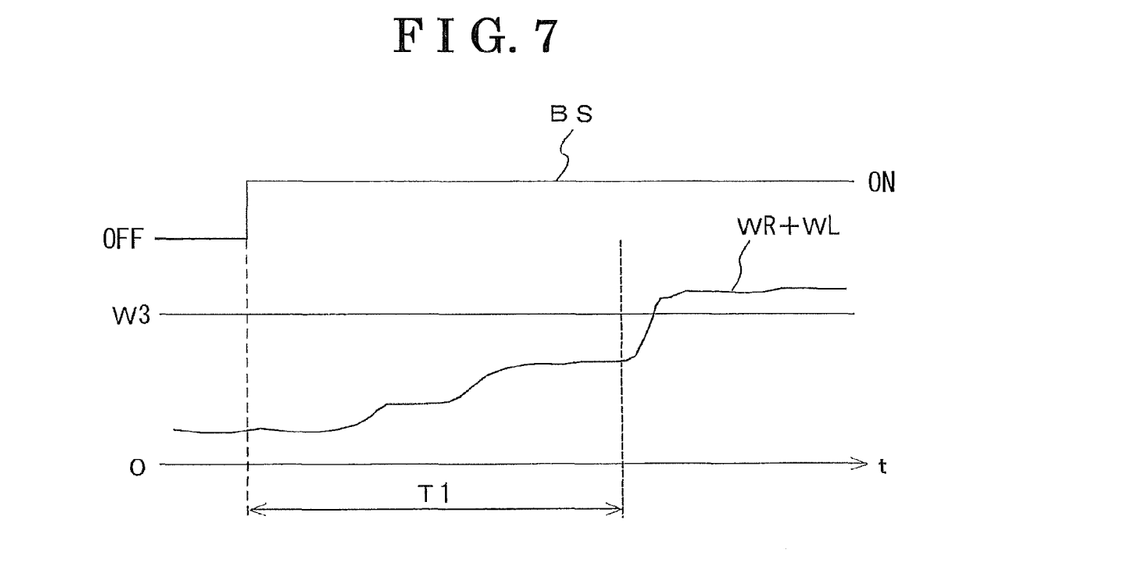
FIG. 7 is a diagram illustrating the seating load of the seat when a child seat is fastened on the seat and a vehicle is accelerated.

On the other hand, a trial result of a temporal change of the total load WR+WL in a state where the child seat is fastened on the seat 1 and then the driver of the vehicle drives the vehicle so as to accelerate forwardly under a predetermined driving condition is shown in FIG. 7. In FIG. 7, the operation signal of the buckle switch 6 is indicated by BS and the total load WR+WL is indicated by WR+WL. As illustrated in FIG. 7, when the vehicle is forwardly accelerated under the predetermined driving condition, the total load WR+WL is prevented from reaching the third threshold load W3 within the first threshold time T1 after the buckle switch 6 is turned on.

Accordingly, each of the detections or determinations in steps S407 and S408 whether or not the total load WR+WL reaches the third threshold load W3 within the first threshold time T after the buckle switch 6 is turned on distinguishes the case where the adult is seated on the seat 1 from the case where the vehicle is forwardly accelerated while the child seat is being fastened on the seat 1.

Figure 5:
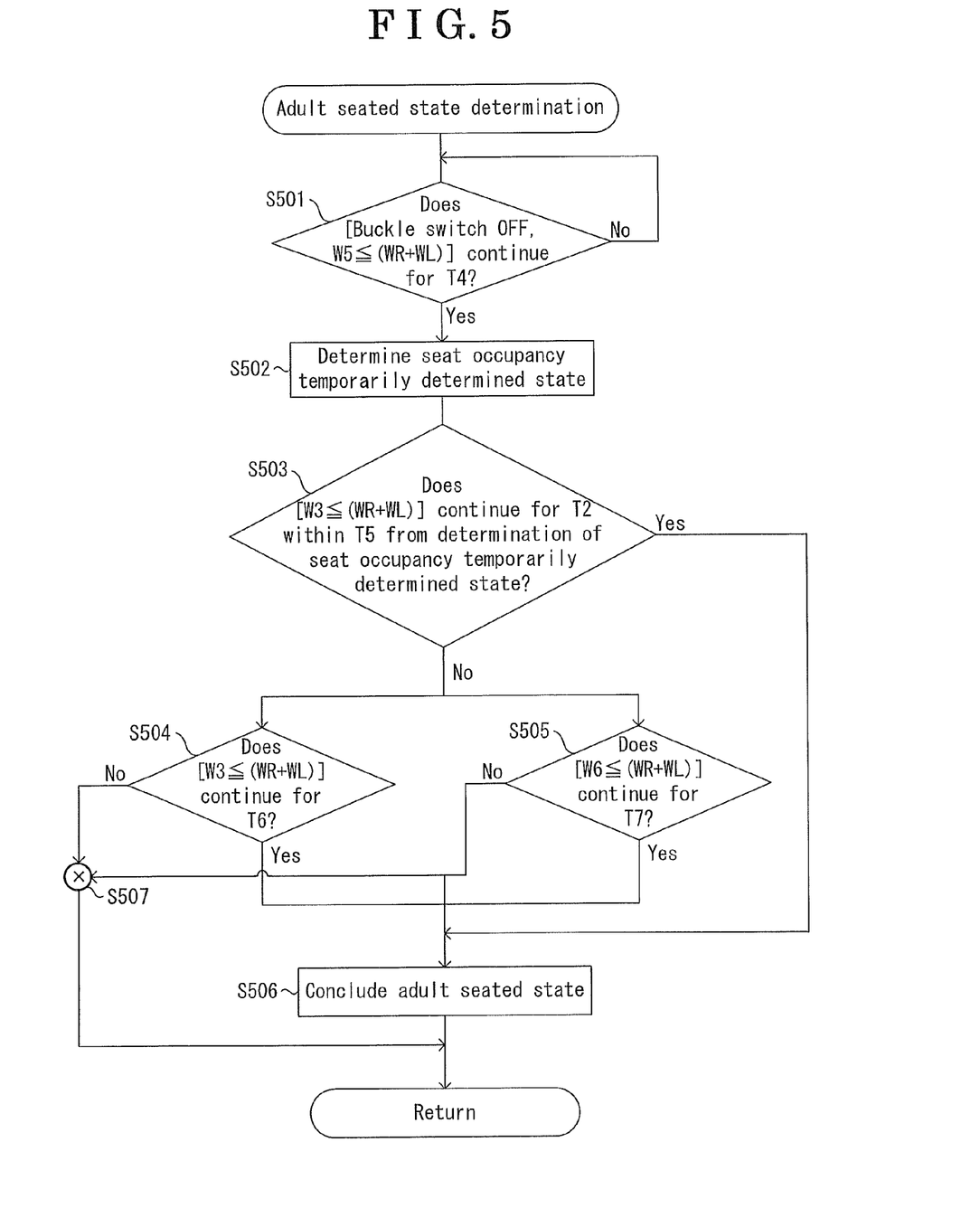
FIG. 5 is a flowchart illustrating the determination method by the apparatus for determining the seat occupancy when a buckle switch is turned off.

Next, a method for determining whether the adult is seated on the seat 1 will be explained with reference to FIG. 5 so that the seat occupancy determination is shifted from the "no passenger seated state" to the "seat occupancy temporarily determined state" (i.e., H2 in FIG. 3) and is then shifted from the "seat occupancy temporarily determined state" to the "adult seated state" (i.e., H4 in FIG. 3). In FIG. 5, steps S504 and S505 are concurrently performed. Step S506 is performed when the positive determination is made at least one of steps S504 and S505. In addition, a linked point P507 in FIG. 5 indicates that the determination of the adult seated state is terminated in a case where the negative determination is made at both steps S504 and S505.

In the determination of "no passenger seated state", it is determined in step S501 whether or not a state, where the buckle switch 6 is turned off and the total load WR+WL is equal to or greater than a predetermined fifth threshold load W5, is maintained for a predetermined fourth threshold time T4. The fifth threshold load W5 is desirably defined to be smaller than the first threshold load W1. When it is determined that the state, where the buckle switch 6 is turned off and the total load WR+WL is equal to or greater than the fifth threshold load W5, is maintained for the fourth threshold time T4, the "seat occupancy temporarily determined state" is determined in step S502.

Next, it is determined in step S503 whether or not a state, where the total load WR+WL is equal to or greater than the third threshold load W3, is maintained for the second threshold time T2 within a predetermined fifth threshold time T5, serving as a set time, from the determination of the "seat occupancy temporarily determined state". When it is determined that the state, where the total load WR+WL is equal to or greater than the third threshold load W3, which serves as the first load, is maintained for the second threshold time T2 within the fifth threshold time T5, the "adult seated state" is determined in step S506. That is, when the adult is properly seated on the seat 1 from the beginning, the determination result of the controller 3 is shifted to the "adult seated state" within a short period of time via the "no passenger seated state" and the "seat occupancy temporarily determined state".

In a case where the state in which the total load WR+WL is equal to or greater than the third threshold load W3 does not continue for the second threshold time T2 at a time when the fifth threshold time T5 is fulfilled, the "seat occupancy temporarily determined state" is maintained, and steps S504 and S505 are concurrently performed. In step S504, it is determined whether or not a state, where the present total load WR+WL is equal to or greater than the third threshold load W3, is maintained for a predetermined sixth threshold time T6 serving as a second time. The sixth threshold time T6 is much longer than the second threshold time T2 and is defined to be longer than a time period while the seating load equal to or greater than the third threshold load W3 is applied to the seat 1 by the acceleration of the vehicle.

According to the present embodiment, the threshold load in step S504 (i.e., the third threshold load W3) and the threshold load that corresponds to the first load in step S503 (i.e., the third threshold load W3) are equal to each other. Alternatively, the threshold load in step S504 may be larger than the threshold load in step S503.

In step S505, it is determined whether or not a state, where the present total load WR+WL is equal to or greater than a predetermined sixth threshold load W6, serving as a second load, is maintained for a predetermined seventh threshold time T7 serving as a third time. In this case, the sixth threshold load W6 is greater than the third threshold load W3, and the seventh threshold time T7 is smaller than the sixth threshold time T6. Further, the seventh threshold time T7 is longer than the second threshold time T2.

When at least one of the determination condition in step S504 and the determination condition in step S505 is satisfied, the seat occupancy determination is shifted from the "seat occupancy temporarily determined state" to the "adult seated state". The "adult seated state" is settled in S506. On the other hand, when neither the determination condition in step S504 nor the determination condition in step S505 is satisfied, the determination of the adult seated state is terminated.

The aforementioned third threshold load W3, the sixth threshold load W6, the sixth threshold time T6, the seventh threshold time T7 and the like are appropriately defined by an execution of various trials so as to identify a case where the adult is seated on the seat 1 and a case where the vehicle is forwardly accelerated in the "seat occupancy temporarily determined state".

Figure 8:
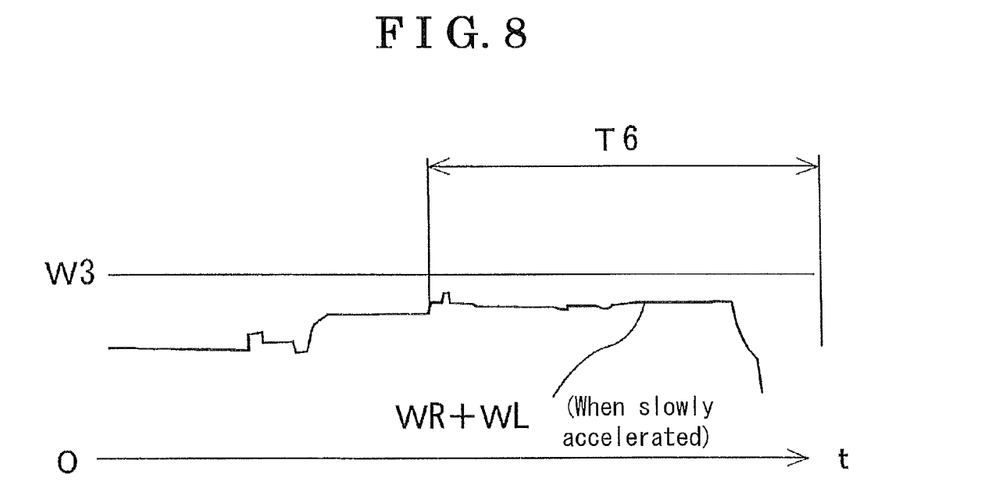
FIG. 8 is a diagram illustrating the seating load of the seat when the vehicle is slowly accelerated in a seat occupancy temporarily determined state.
Figure 9:
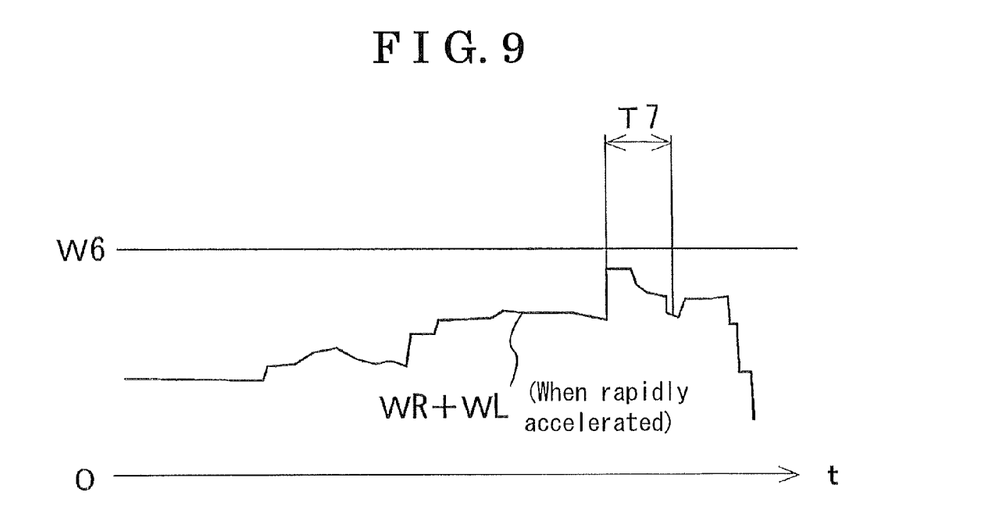
FIG. 9 is a diagram illustrating the seating load of the seat when the vehicle is rapidly accelerated in the seat occupancy temporarily determined state.

A trial result of a temporal change of the total load WR+WL in a state where the vehicle is forwardly accelerated in the "seat occupancy temporarily determined state" of the seat 1 is shown in FIGS. 8 and 9. In FIGS. 8 and 9, the total load WR+WL is indicated by WR+WL. In a state where the vehicle is slowly accelerated under predetermined road condition and driving condition, the total load WR+WL gradually increases along the elapse of the acceleration time as illustrated in FIG. 8. However, the total load WR+WL is prevented from reaching the third threshold load W3.

In a case where the vehicle is rapidly accelerated under different road condition and driving condition from those for the case where the vehicle is slowly accelerated, the total load WR+WL increases while fluctuating as illustrated in FIG. 9. However, the total load WR+WL is prevented from reaching the sixth threshold load W6. In addition, in a state where the vehicle is rapidly accelerated, the total load WR+WL may reach the third threshold load W3 but the total load WR+WL equal to or great than the third threshold load W3 is prevented from continuing for the sixth threshold time T6.

On the other hand, in a case where the adult is seated on the seat 1, it is confirmed by various trials that the total load WR+WL constantly exceeds the third threshold load W3. Accordingly, the determination of whether or not the state, where the total load WR+WL is equal to or greater than the third threshold load W3, is maintained for the sixth threshold time T6 in S504 or the determination of whether or not the state, where the total load WR+WL is equal to or greater than the sixth threshold load W6, is maintained for the seventh threshold time T7 distinguishes the case where the adult is seated on the seat 1 from the case where the vehicle is forwardly accelerated in the "seat occupancy temporarily determined state" of the seat 1.

According to the present embodiment, when a predetermined sixth condition (i.e., step S405 in FIG. 4) is satisfied after the determination of the "child seat fastened state" by the controller 3, the determination result of the "child seat fastened state" is retained even when the total load WR+WL becomes equal to or greater than the third threshold load W3. Thus, even when the total load WR+WL equal to or greater than the third threshold load W3 is detected, the seat occupancy determination is prevented from being shifted from the "child seat fastened state" to the "adult seated state", thereby achieving the accurate determination of the seat occupancy of the seat 1.

In addition, the elapse of the first threshold time T1 after the determination of the "child seat fastened state" is used as a predetermined condition (i.e., the determination result retention condition) for continuing the determination result of the "child seat fastened state". As a result, the case where the adult is seated on the forward portion of the seat 1 and the "child seat fastened state" are distinguishable from each other.

That is, when the adult passenger who is seated on the forward portion of the seat 1 adjusts his/her posture or seating position, the seating load detected by the seat sensor 2L, 2R may increase within a short period of time. Thus, when the first threshold time T1 elapses after the determination of the "child seat fastened state", the detection of the total load WR+WL equal to or grater than the third threshold load W3 is regarded as being caused by the acceleration of the vehicle. The determination result of the "child seat fastened state" is maintained so as to be distinguishable from the "adult seated state".

Further, in a case where the "adult seated state" of the seat 1 is not determined within the fifth threshold time T5 after the detection of disengagement of the buckle of the seatbelt by the buckle switch 6 and thus the "seat occupancy temporarily determined state" is obtained, and thereafter it is detected that the state, where the total load WR+WL is equal to or greater than the third threshold load W3, is maintained for the sixth threshold time T6, the "adult seated state" is determined so as to be distinguishable from the "seat occupancy temporarily determined state".

That is, it is considered that the load applied to the seat cushion 11 by the acceleration of the vehicle while the vehicle, in which the adult is not seated on the seat 1, is being driven is smaller than the load generated at the seat cushion 11 in a state where the adult is actually seated on the seat 1 of the vehicle. In addition, a time period during which the load is applied to the seat cushion 11 by the acceleration of the vehicle where the adult is not seated on the seat 1 may be shorter than a time period during which the seating load is generated by the adult seated on the seat 1.

Therefore, the exceeding threshold values, i.e., the third threshold load W3 and the sixth threshold time T6, are used for the load generated at the seat cushion 11 by the acceleration of the vehicle and a time period during which the load is generated at the seat cushion 1. Then, the detection of the state, where the total load WR+WL equal to or greater than the third threshold load W3, is maintained for more than the sixth threshold time T6 results in the determination of the "adult seated state" that is distinguishable from the case caused by the acceleration of the vehicle.

In addition, when the state, where the total load WR+WL is equal to or greater than the sixth threshold load W6 that is greater than the third threshold load W3, is maintained for the seventh threshold time T7 that is shorter than the sixth threshold time T6 in the "seat occupancy temporarily determined state", the "adult seated state" is determined. Accordingly, in addition to the case where the vehicle is slowly accelerated, the "adult seated state" is determined while the vehicle is being rapidly accelerated so as to be distinguishable from the case where the load is generated by the acceleration of the vehicle.

At least one seat sensor 2L attached to the left portion of the seat cushion 11 and at least one seat sensor 2R attached to the right portion of the seat cushion 11 achieve the detection of the seating load unevenly applied to either the left or right portion of the seat cushion 11. In addition, the total load WR+WL obtained by a sum of loads that are detected by the seat sensors 2L and 2R is used as the seating load, thereby accurately detecting the change in the seating load even when the load is unevenly applied to the left and right portions of the seat cushion 11.

Further, the seat sensors 2L and 2R provided at the rear portion of the seat cushion 11 may easily receive the load of the passenger or the child seat. Accordingly, even when the seat sensors 2L and 2R are not provided at the front portion of the seat cushion 11, the load applied to the seat cushion 11 is accurately detected, thereby achieving both the accurate determination of the seat occupancy of the seat 1 and a reduced cost of the seat 1 resulting from the reduced number of seat sensors 2L and 2R.

The present embodiment is not limited to have the aforementioned structure and may be modified or changed as follows. In a case where the first threshold time T1 elapses after the determination of the "child seat fastened state" and the acceleration or the speed of the vehicle (both of which are induced from a detection value of the speed sensor 8) where the seat 1 is mounted is equal to or greater than a predetermined value, the seat occupancy determination is not shifted to the "adult seated state" and the "child seat fastened state" may be concluded. Accordingly, in addition to the elapse of the first threshold time T1 after the determination of the "child seat fastened state", the state where the acceleration or the speed of the vehicle is equal to or greater than the predetermined value is detected to maintain the determination result of the "child seat fastened state", thereby accurately distinguishing from the "adult seated state".

In place of the detection that the first threshold time T1 elapses after the determination of the "child seat fastened state", a detection of whether or not the acceleration or the speed of the vehicle where the seat 1 is mounted is equal to or greater than a predetermined value may result in a prevention of the seat occupancy determination from being shifted to the "adult seated state", thereby fixing the "child seat fastened state".

The present embodiment is not limited to be applied to the front passenger seat 1 and may be applied to a middle seat or a rear seat. In addition, the seat sensor 2L, 2R may be a pressure sensor that detects the pressure generated at the seat cushion 11 when the passenger is seated on the seat 1 so as to detect the load applied to the seat cushion 11 based on the detected pressure. Further, the seat sensor 2L, 2R may be a displacement sensor that detects the displacement of the seat 1 when the passenger is seated on the seat 1 so as to detect the load applied to the seat cushion 11 based on the displacement against a biasing force of a seat spring of the seat cushion 11.

According to the present embodiment, at least one seat sensor 2L, 2R is provided at the seat cushion 11. In a case where the multiple seat sensors 2L, 2R are provided, the left seat sensor 2L and the right seat sensor 2R may be provided only at the front portion of the seat cushion 11. Alternatively, the left and right seat sensors 2L and 2R may be provided at four corners of the seat cushion 11, respectively. Further alternatively, the left seat sensor 2L may be provided at a rear-left portion and the right seat sensor 2R may be provided at a front-right portion of the seat cushion 11. Still further alternatively, the left seat sensor 2L may be provided at a front-left portion and the right seat sensor 2R may be provided at a rear-right portion of the seat cushion 11.

Further, the apparatus for determining the seat occupancy includes the seat sensor 2L, 2R provided at the seat cushion 11 and detecting the seating load applied to the seat cushion 11, the buckle switch 6 detecting an engagement of the buckle of the seatbelt device provided at the seat 1, the controller 3 determining that the adult is seated on the seat 1 in a case where the seating load equal to or greater than the third threshold load W3 is detected by the seat sensor 2L, 2R and determining the child seat fastened state where the child seat is placed on the seat 1 and fastened by the seatbelt in a case where the seating load smaller than the third threshold load W3 is detected by the seat sensor 2L, 2R and the engagement of the buckle of the seatbelt is detected by the buckle switch 6. Then, the controller 3, which once determines the child seat fastened state, may change the determination result to determine that the adult is seated on the seat 1 when the seating load becomes equal to or greater than the third threshold value W3 in a state where a predetermined determination result change condition is satisfied, and may maintain the determination result of the child seat fastened state even when the seating load becomes equal to or greater than the third threshold load W3 in a case where the determination result change condition is not satisfied.

According to the aforementioned embodiment, even when the seating load equal to or greater than the third threshold load W3 is detected, the seat occupancy determination is prevented from being shifted from the "child seat fastened state" to the "adult seated state" so that the determination result of the "child seat fastened state" is maintained as long as the predetermined determination result retention condition is satisfied after the determination of the "child seat fastened state". As a result, the seat occupancy state of the seat 1 is accurately determined.

The determination result retention condition for maintaining the determination result of the child seat fastened state includes an elapse of the first threshold time T1 after the determination of the child seat fastened state.

Accordingly, the case where the adult is seated forward of the seat 1 and the case where the child seat is fastened to the seat 1 are distinguishable from each other.

That is, in a case where the adult who is seated forward of the seat 1 then adjusts his/her posture or seating position, the seating load detected by the seat sensor 2L, 2R may increase for a short period of time. Thus, when the first threshold time T1 elapses after the determination of the "child seat fastened state", the detection of the seating load equal to or greater than the third threshold load W3 is regarded as being caused by the acceleration of the vehicle, and the like. The determination result of the "child seat fastened state" is maintained so as to be distinguishable from the "adult seated state" of the seat 1.

The determination result retention condition for maintaining the determination result of the child seat fastened state includes an elapse of the first threshold time after the determination of the child seat fastened state and an acceleration of the vehicle, at which the seat 1 is mounted, being equal to or greater than a predetermined value.

Accordingly, the "child seat fastened state" may be further accurately distinguishable from the "adult seated state".

The controller 3 determines that the adult is seated on the seat 1 in a case where the adult is not determined to be seated on the seat 1 within the fifth threshold time T5 from a detection of a disengagement of the buckle of the seatbelt by the buckle switch 6 and thereafter the seat sensor 2L, 2R detects that the seating load equal to or greater than the third threshold load W3 is maintained for the sixth threshold time T6.

That is, the load applied to the seat cushion 11 by the acceleration of the vehicle while the vehicle at which the adult is not seated on the seat 1 is being driven is considered to be smaller than the load generated by the adult actually seated on the seat 1. In addition, a time period during which the load is applied to the seat cushion 11 by the acceleration of the vehicle where the adult is not seated on the seat 1 may be shorter than a time period during which the load generated by the adult seated on the seat 1 is detected. Therefore, the exceeding threshold values, i.e., the third threshold load W3 and the sixth threshold time T6, are used for the load generated at the seat cushion 11 by the acceleration of the vehicle and the time period during which the load is generated at the seat cushion 1. Then, the detection of the state, where the seating load that is detected by the seat sensor 2L, 2R equal to or greater than the third threshold load W3, is maintained for the sixth threshold time T6 or more is led to a distinction from the load caused by the acceleration of the vehicle. As a result, the adult seated state is accurately determined.

The controller 3 determines that the adult is seated on the seat 1 in a case where the adult is not determined to be seated on the seat 1 within the fifth threshold time T5 from the detection of the disengagement of the buckle of the seatbelt by the buckle switch 6 and thereafter the seat sensor 2L, 2R detects that the seating load equal to or greater than the sixth threshold load W6 that is larger than the third threshold load W3 is maintained for the seventh threshold time T7 that is shorter than the sixth threshold time T6 regardless of whether or not the seating load equal to or greater than the third threshold load W3 is maintained for the sixth threshold time T6.

Accordingly, in addition to the case where the vehicle is being slowly accelerated as mentioned above, the case where the vehicle is being rapidly accelerated is distinguishable from the case where the adult is seated on the seat 1, thereby further accurately determining the seat occupancy state of the seat 1.

The load detecting portion include one seat sensor 2L mounted at a left portion of the seat cushion 11 and one seat sensor 2R mounted at a right portion of the seat cushion 11.

Accordingly, the seating load unevenly applied to either the left or right portion of the seat cushion 11 may be detectable.

The controller 3 calculates the seating load by a sum of loads detected by the seat sensors 2L and 2R.

Accordingly, even in a case where the seating load is unevenly applied to either the left or right portion of the seat 1, the change in seating load is accurately detectable.

The seat sensors 2L and 2R are mounted at a rear portion of the seat cushion 11.

Accordingly, the load generated by the passenger or the child seat is easily applied to the seat sensors 2L and 2R provided at the rear portion of the seat cushion 11. Thus, in a case where the seat sensors 2L and 2R are not provided at the front portion of the seat cushion 11, the load applied to the seat cushion 11 is accurately detectable. The accurate determination of the seat occupancy state of the seat 1 and the reduced cost of the seat 1 resulting from the reduced number of seat sensors 2L and 2R are compatible with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining a seat occupancy, comprising:
   a load detecting portion provided at a seated portion of a seat for a vehicle and detecting a seating load applied to the seated portion;
   a seatbelt detecting portion detecting an engagement of a buckle of a seatbelt provided at the seat; and
   a seat occupancy determining portion determining that an adult is seated on the seat in a case where the seating load equal to or greater than a predetermined first load is detected by the load detecting portion and determining a child seat placed state where a child seat is placed on the seat and fastened by the seatbelt in a case where the seating load smaller than the predetermined first load is detected by the load detecting portion and the engagement of the buckle of the seatbelt is detected by the seatbelt detecting portion,
   the seat occupancy determining portion maintaining a determination result of the child seat placed state even when the seating load becomes equal to or greater than the predetermined first load in a case where a predetermined determination result retention condition is satisfied after the child seat placed state is determined;
   wherein the seat occupancy determining portion determines that the adult is seated on the seat in a case where the adult is not determined to be seated on the seat within a set time from a detection of a disengagement of the buckle of the seatbelt by the seatbelt detecting portion and thereafter the load detecting portion detects that the seating load equal to or greater than the predetermined first load is maintained for a predetermined second time;
   wherein the seat occupancy determining portion determines that the adult is seated on the seat in a case where the adult is not determined to be seated on the seat within the set time from the detection of the disengagement of the buckle of the seatbelt by the seatbelt detecting portion and thereafter the load detecting portion detects that the seating load equal to or greater than a predetermined second load that is larger than the predetermined first load is maintained for a predetermined third time that is shorter than the second time regardless of whether or not the seating load equal to or greater than the predetermined first load is maintained for the second time.

2. The apparatus according to claim 1, wherein the determination result retention condition for maintaining the determination result of the child seat placed state includes an elapse of a predetermined first time after the determination of the child seat placed state.

3. The apparatus according to claim 2, wherein the load detecting portion includes one load detecting device mounted at a left portion of the seated portion and one load detecting device mounted at a right portion of the seated portion.

4. The apparatus according to claim 3, wherein the load detecting devices are mounted at a rear portion of the seated portion.

5. The apparatus according to claim 1, wherein the determination result retention condition for maintaining the determination result of the child seat placed state includes an elapse of a predetermined first time after the determination of the child seat placed state and an acceleration of the vehicle, at which the seat is mounted, being equal to or greater than a predetermined value.

6. The apparatus according to claim 5, wherein the load detecting portion includes one load detecting device mounted at a left portion of the seated portion and one load detecting device mounted at a right portion of the seated portion.

7. The apparatus according to claim 6, wherein the load detecting devices are mounted at a rear portion of the seated portion.

8. The apparatus according to claim 1, wherein the load detecting portion includes one load detecting device mounted at a left portion of the seated portion and one load detecting device mounted at a right portion of the seated portion.

9. The apparatus according to claim 8, wherein the seat occupancy determining portion calculates the seating load by a sum of loads detected by the load detecting devices.

10. The apparatus according to claim 8, wherein the load detecting devices are mounted at a rear portion of the seated portion.

\* \* \* \* \*